United States Patent [19]

Van Der Linden et al.

[11] Patent Number: 5,069,471
[45] Date of Patent: Dec. 3, 1991

[54] TRAVEL AND UTILITY TRAILER COMBINATION

[75] Inventors: James A. Van Der Linden, Route 1, Box 8B, Lismore, Minn. 56155; John J. Van Der Linden, Route 1, Box 48, Kenneth, Minn. 56147

[73] Assignees: James A. Van Der Linden, Lismore; John J. Van Der Linden, Kenneth, both of Minn.

[21] Appl. No.: 633,931

[22] Filed: Dec. 26, 1990

[51] Int. Cl.⁵ .................... B60P 3/071; B60P 3/367
[52] U.S. Cl. .................. 280/414.1; 280/405.1; 280/408; 414/476; 414/483; 296/157
[58] Field of Search ............... 280/402, 405.1, 408, 280/414.1, 414.5, 418; 414/282, 474, 476, 483; 296/157

[56] References Cited

U.S. PATENT DOCUMENTS

| | | | |
|---|---|---|---|
| 3,348,859 | 10/1967 | Melbye | 280/414.1 X |
| 3,380,607 | 4/1968 | Dale | 414/477 |
| 3,556,582 | 1/1971 | Bledsoe | 296/157 |
| 3,649,064 | 3/1972 | Bledsoe | 296/157 |
| 3,651,969 | 3/1972 | Bledsoe | 414/498 |
| 3,751,073 | 8/1973 | Alexander et al. | 280/482 |
| 4,363,590 | 12/1982 | Crate | 414/518 |
| 4,597,585 | 7/1986 | Littlejohn | 280/414.1 X |
| 4,626,162 | 12/1986 | Parisi | 414/479 |
| 4,705,289 | 11/1987 | Weber | 280/414.1 |

*Primary Examiner*—Charles A. Marmor
*Assistant Examiner*—Kevin Hurley
*Attorney, Agent, or Firm*—Kinney & Lange

[57] ABSTRACT

A travel and utility trailer combination includes a house trailer with a wheel mounted main frame supporting a main closure or house. The main frame has two spaced-apart side beams rearwardly thereof. An auxiliary trailer is hitched to the main frame to have position between the side beams. Side beam extensions are pivoted to the ends of the side beams to have end portions underlying the axle of the auxiliary trailer. A hydraulic linear motor is provided to raise the side beam extensions to horizontal positions to lift the auxiliary trailer wheels off of the ground for over-the-road travel. Removable positioning pins passing through openings in the side beam extensions and plates integral with the side beams maintain these extensions in horizontal position.

14 Claims, 5 Drawing Sheets

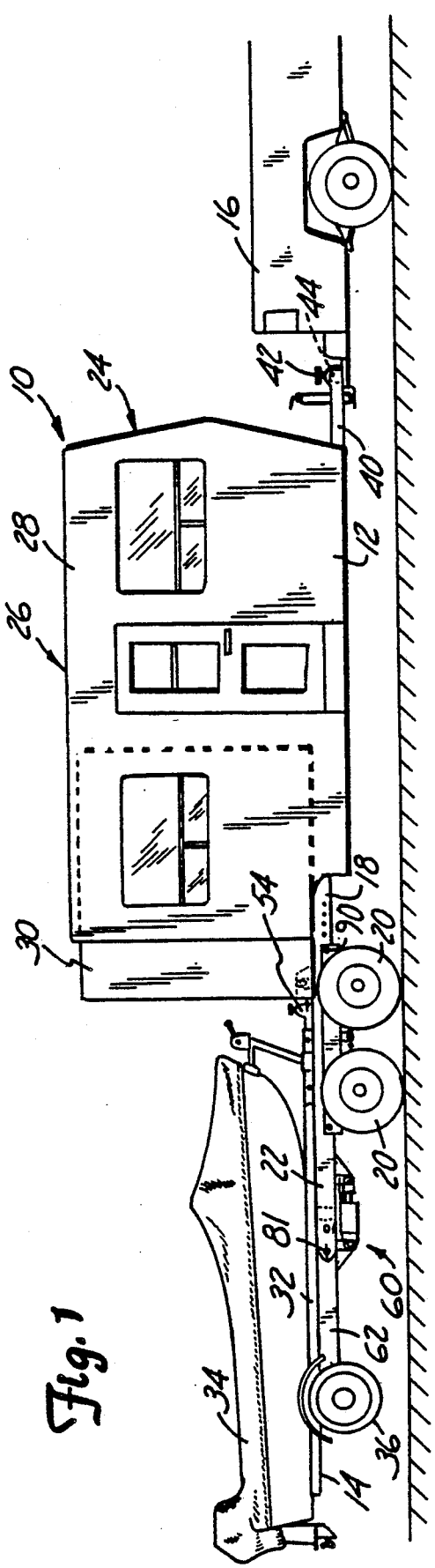
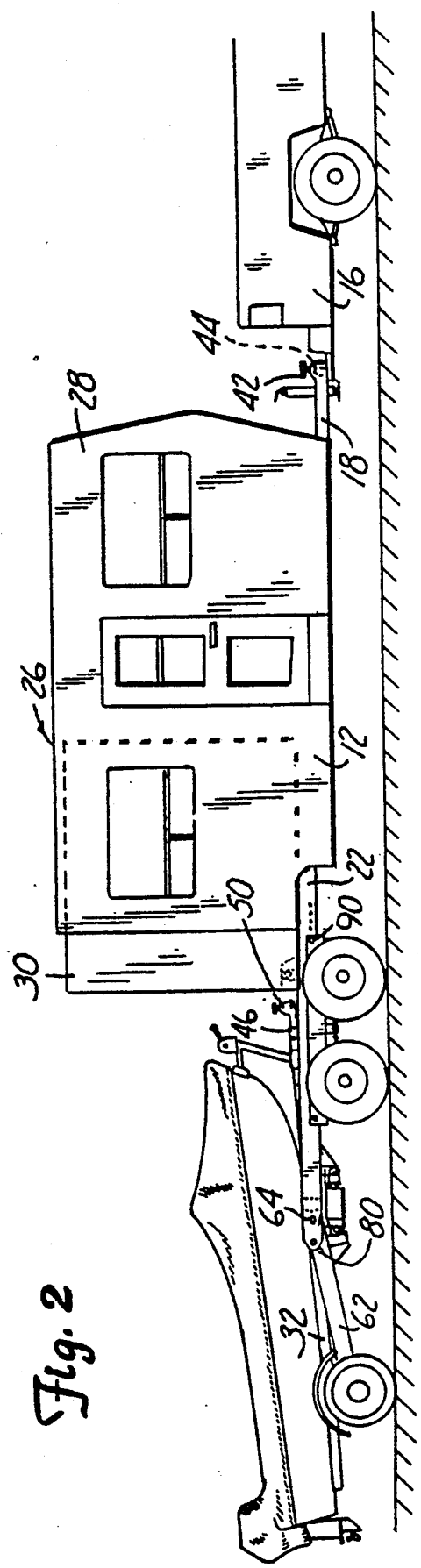

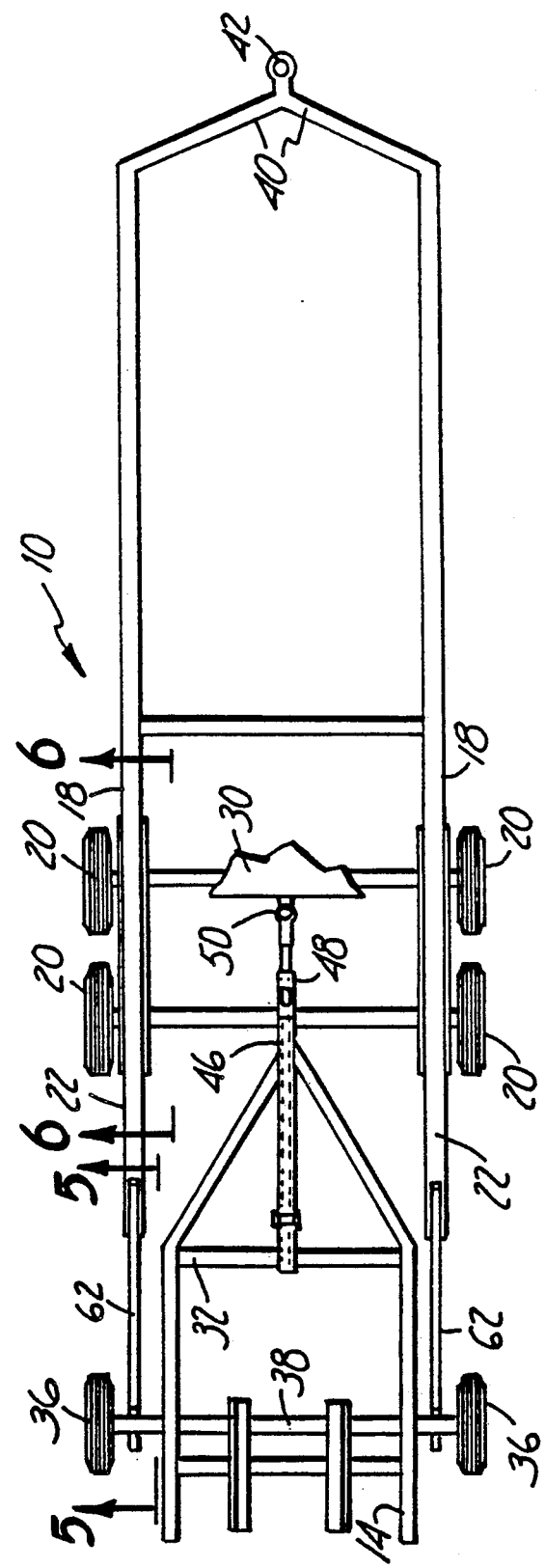

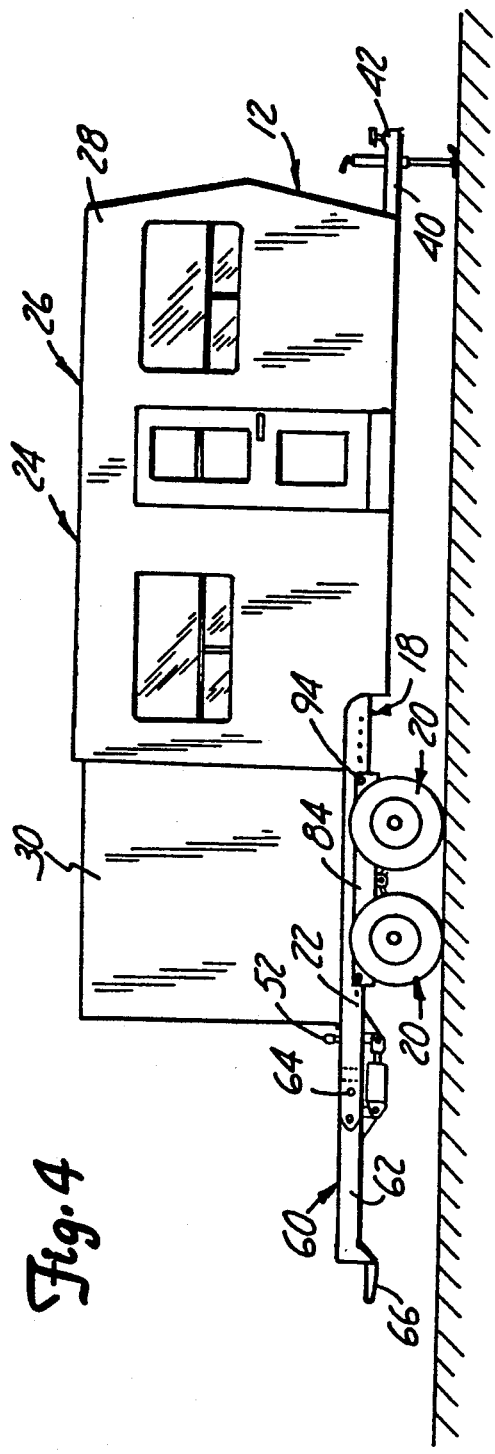
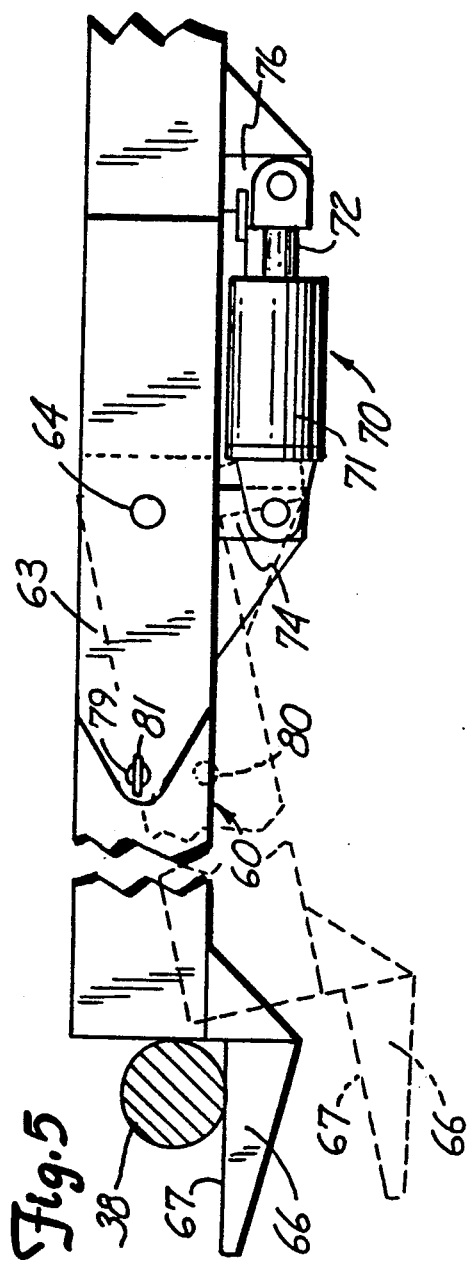

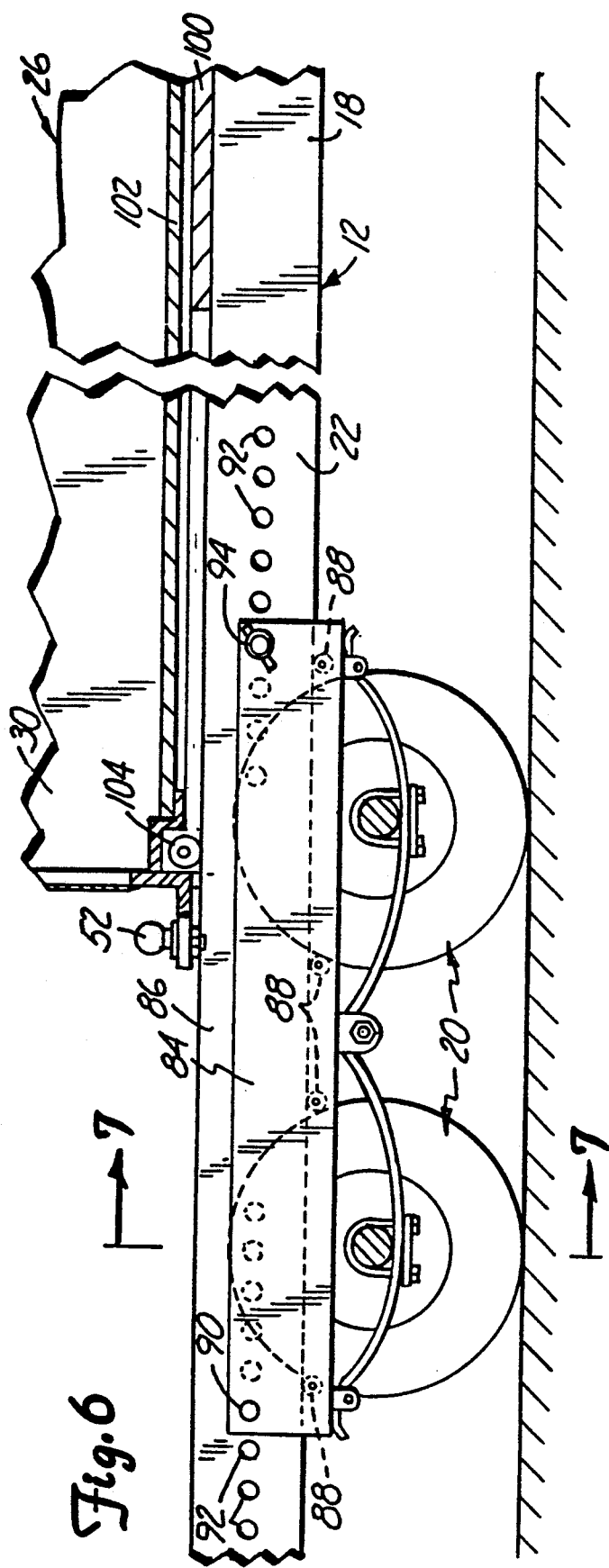
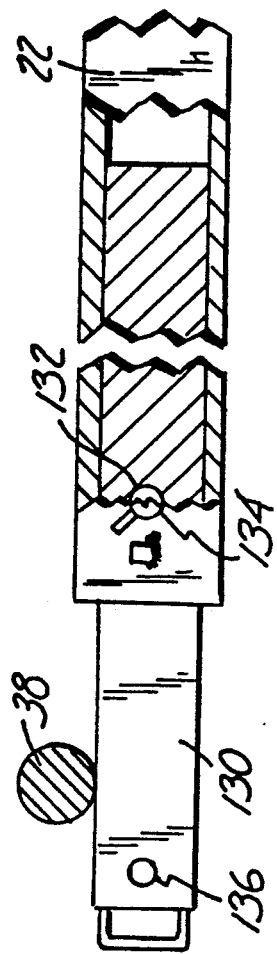

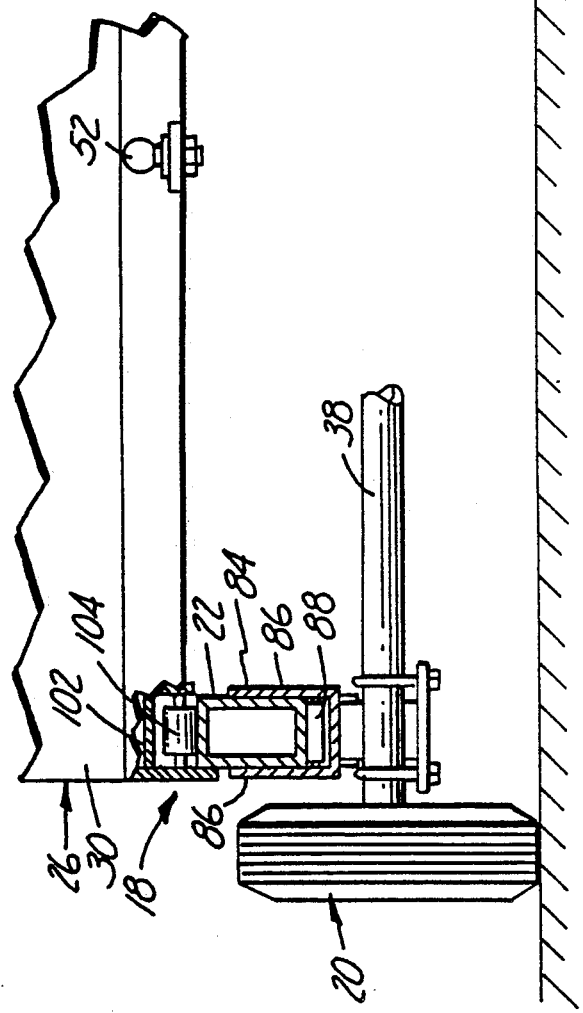
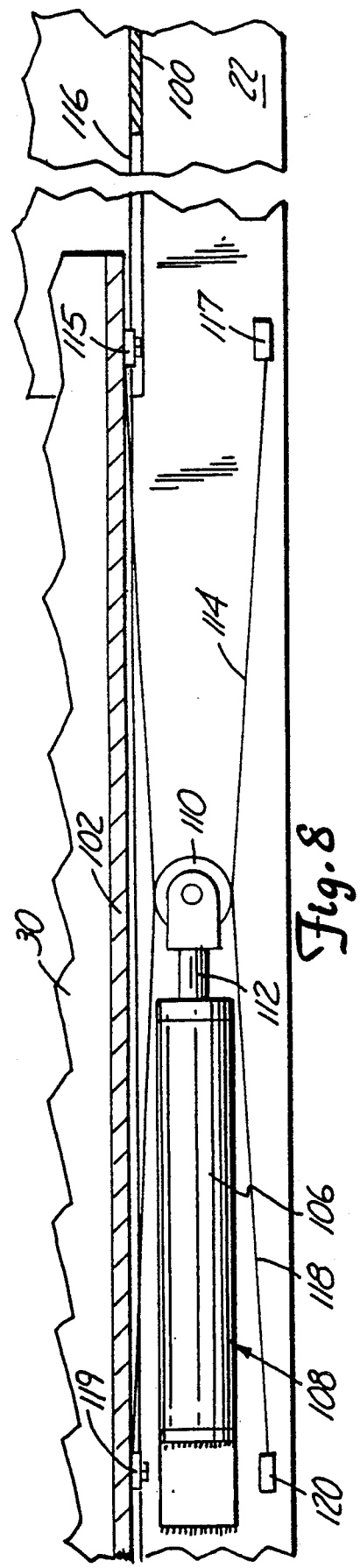

5,069,471

TRAVEL AND UTILITY TRAILER COMBINATION

BACKGROUND OF THE INVENTION

This invention has relation to travel trailers which are adapted to be combined with auxiliary utility trailers in such a way as to support the entire combination on one central set of wheels.

It is known to support auxiliary boat trailers on the main frame of a house trailer or travel trailer. In the patents to Bledsoe, U.S. Pat. No. 3,649,064 granted Mar. 14, 1972 and U.S. Pat. No. 3,651,969 granted Mar. 28, 1972, an auxiliary trailer is backed in between a pair of spaced-apart tracks projecting rearwardly from the house trailer, the front end of the auxiliary trailer is supported with respect to the ground while the auxiliary trailer is coupled to the rear portion of the house trailer and the wheels on the auxiliary trailer are cranked up off of the ground. When it is desired to tow the trailer separately, while the trailers are still coupled together, a support is provided at the trailer tongue end of the auxiliary trailer in order that the auxiliary trailer wheels can be mechanically cranked down toward the ground, and then the front support remains in place until the two trailers are uncoupled from each other at which point a towing vehicle can back into the auxiliary trailer to be hitched and the support of the auxiliary trailer at the trailer tongue end is no longer necessary.

The idea of supporting a utility trailer between a towing vehicle and a boat trailer is disclosed in U.S. Pat. No. 3,751,073 to Alexander et al, granted on Aug. 7, 1973. This patent shows a "piggy back extension 30" between the front end of a boat trailer and the rear end of another vehicle. To load the small utility trailer 54 onto the piggy back extension 30, trailer 54 is backed into place over the towing end of the extension. After the utility trailer 54 is hooked to a trailer hitch at a front portion of the piggy back extension, the piggy back extension and the utility trailer are lifted apparently by main force to get high enough so that the extension can be hitched to the towing vehicle.

U.S. Pat. No. 3,380,607 granted to Dale on Apr. 30, 1968 shows the broad idea of supporting a boat on a rear portion of the main frame of a trailer where a housing unit or main closure is supported on a forward portion of the trailer. There are no separate wheels on the trailer to support the boat, and when we have to back the entire trailer including the housing unit down to the water's edge or beyond in order to get the boat on and off.

Also cited as of general interest by a skilled searcher are U.S. Pat. No. 3,463,590 granted to Crate on Dec. 14, 1982; U.S. Pat. No. 4,626,162 granted to Parisi on Dec. 1, 1986; and U.S. Pat. No. 4,705,278 granted to Weber on Nov. 10, 1987. These patents are not believed to be particularly pertinent to the concept of the present invention.

SUMMARY OF THE INVENTION

For use with a prime mover, a combination house vehicle and auxiliary trailer apparatus includes a longitudinally extending house vehicle operably associated with the prime mover and including a main frame carried by at least one ground-supported set of first wheels for movement on its longitudinal axis. The main frame has a main closure supported on a forward portion of it. The main frame includes a pair of parallel, spaced-apart, longitudinally extending side beams. A longitudinally extending auxiliary trailer includes an auxiliary trailer frame, a second set of wheels rotatably mounted with respect to a rearward portion of the auxiliary trailer frame, and auxiliary trailer tongue means extending longitudinally forward from the auxiliary trailer frame. Means is provided to pivotally support the auxiliary trailer tongue means with respect to the house vehicle in a hitched position wherein the auxiliary trailer frame is between rearward portions of the main frame side beams and is pivotal with respect to the main frame on at least a horizontal axis transverse to the longitudinal axes of the house vehicle and the auxiliary trailer. Means is provided to pivot the hitched auxiliary trailer frame with respect to the main frame between a loading position with the second set of wheels on the ground and a transport position with said wheels elevated above the ground; and means is provided to maintain the auxiliary trailer frame in its transport position with respect to the main frame during over-the-road transport of the combination house vehicle and auxiliary trailer apparatus.

BRIEF DESCRIPTION OF THE DRAWINGS

FIG. 1 is a side elevational view of a longitudinally extending travel trailer or house trailer supporting a housing unit, house or main closure on a main frame which is attached to a towing vehicle serving as a prime mover and with an auxiliary trailer supporting an auxiliary load, a boat as shown, the auxiliary trailer being supported on the main frame of the travel trailer in a transport position with the auxiliary trailer wheels positioned above the ground;

FIG. 2 is a side elevational view of the apparatus of the invention as seen in FIG. 1 but with the auxiliary trailer pivoted with respect to the house trailer to a loading position with the auxiliary trailer wheels supported on the ground;

FIG. 3 is a top plan view of the house trailer supporting the auxiliary trailer but with the house and boat omitted for clarity of illustration;

FIG. 4 is a side elevational view of the house trailer of FIGS. 1 and 2 with the auxiliary trailer removed and showing the main closure to include a first permanent portion fixedly mounted with respect to a front part of the house trailer main frame and a second slidable portion supported on the main frame and telescopically mounted with respect to the first portion in its extended position;

FIG. 5 is an enlarged fragmentary vertical sectional view taken on the line 5—5 in FIG. 3 with parts omitted and parts broken away;

FIG. 6 is a vertical sectional view taken on the line 6—6 in FIG. 3;

FIG. 7 is a vertical sectional view taken on the line 7—7 in FIG. 6;

FIG. 8 is a fragmentary schematic view showing one form of apparatus for moving the second slidable portion of the main closure with respect to its first fixed portion and main frame;

FIG. 9 is a vertical sectional view similar to that of FIG. 5 showing a variant means of holding the auxiliary trailer in its transport position with its wheels spaced from the ground.

DETAILED DESCRIPTION OF THE PREFERRED EMBODIMENTS

A combination house vehicle or trailer and auxiliary trailer 10 includes a longitudinally extending travel or house trailer 12 and a longitudinally extending auxiliary trailer 14 each adapted to be towed individually or to be towed together by a towing vehicle such as a pickup truck 16 or other prime mover. The house vehicle or trailer 12 includes a main frame 18 carried by at least one ground-supported first set of wheels 20. The main frame includes a pair of mutually parallel, spaced-apart, longitudinally extending side beams 22,22. Living quarters in the form of a house 24 constitutes a main closure 26, a first forward portion 28 of which is fixedly mounted to the main frame, and a second rearward portion 30 of which is slidably mounted on the main frame to telescope into and away from the first portion 28.

The auxiliary trailer 14 includes an auxiliary trailer frame 32 configured to support an auxiliary load such as a boat 34. This auxiliary trailer frame is supported on a second set of wheels 36,36 which are rotatably mounted with respect to a rearward portion of the auxiliary trailer frame 32 on axle means 38. As shown, each of the wheels of the second set are positioned outboard of the outside edges of the auxiliary trailer frame 32. When the auxiliary trailer 14 is in longitudinal alignment with the house trailer 12 and between the side beams 22,22, the wheels 36,36 of the second set extend outboard of main frame side beams 22,22.

As shown, the house trailer main frame 18 includes forwardly extending house trailer tongue means 40 carrying a trailer hitch 42 adapted to connect to an appropriate trailer ball 44 extending rearwardly from the pickup truck or other prime mover 16.

Whereas, as illustrated herein, the prime mover is shown to be embodied as a pickup truck, the house vehicle can be just as well be constituted as a motor home or house in which the prime mover is constituted as an engine integrally mounted with respect to the main frame 18 and connected to drive the first set of wheels 20 and/or additional forwardly mounted steering wheels, for example.

As most clearly seen in FIG. 3, the auxiliary trailer frame 32 is configured to fit between rearward portions of the main frame side beams 22,22. Extending forwardly from the auxiliary trailer frame 32 is auxiliary trailer tongue means 46 including an auxiliary trailer tongue 48. An auxiliary trailer connector 50 includes a first part in the form of a trailer ball 52 integrally mounted with respect to the house trailer 12; and a second part 54 in the form of a trailer hitch mounted at a forward end of the trailer tongue 48. Such a trailer connector will normally allow limited pivotal movement of the trailer tongue 48 about the trailer ball 52 in all directions. However, any kind of trailer connector can be used as long as it provides at least pivotal movement of the trailer tongue about the connector on a horizontal axis transverse to the longitudinal axes of the house and auxiliary trailers.

With the auxiliary trailer 14 pivotally supported with respect to the main frame 18 at least on said horizontal axis, as seen in FIG. 2, means is provided to move the auxiliary trailer frame with respect to the main frame between a loading position as seen in FIG. 2 with the second set of wheels 36,36 on the ground and a transport position as seen in FIG. 1 with said second set of wheels elevated from the ground. This means includes auxiliary trailer support means 60 in the form of a pair of main frame side beam extensions 62,62, each pivoted with respect to the rear end of a side beam 22. See FIG. 5. A beam extension support plate 63 extends rigidly and rearwardly in a vertical plane from each vertical side of a rear end portion of each of the main frame side beams 22. Beam extension pivot pins 64 extend through each support plate 63 and forward end portions of each of the side beam extensions 62 to provide this pivotal support.

The rear end of each side beam extension 62 is provided with an auxiliary trailer support means lifting flange 66 extending integrally rearwardly from it.

The length and positioning of the side beam extensions 62 is such that when the auxiliary trailer 14 is in a hitched, loading position as seen in FIG. 2, the radial distance between an upper surface 67 of each lifting flange 66 and the beam extension pivot pins 64 will be such that the lifting flanges 66 can be lifted up under and in operational alignment with axle means 38 which supports the second set of wheels 36,36.

To move the auxiliary trailer 14 from its loading position as seen in FIG. 2 to its transport position as seen in FIG. 1, a linear motor, constituted as a hydraulic motor 70. Motor 80 has a closed end of a piston 71 pivotally mounted with respect to a beam extension drive arm and gusset plate 74 extending integrally downwardly from the extension arm; and has an outer end of a piston rod 72 pivotally mounted to a side beam reaction arm and gusset plate 76 extending integrally downwardly from each side beam 22.

With the hydraulic motor 70 shortened through appropriate hydraulic lines and controls of any usual or preferred nature (not shown), the main frame side beam extensions 62,62 will be lowered to position below axle means 38. The auxiliary trailer 14 will be hitched as shown in FIG. 2, and then, the length of the linear hydraulic motor 70 will be extended to raise the side beam extensions 62,62 and their lifting flanges 66, axle means 38 and, consequently, the auxiliary trailer and anything supported on it, to a transport position as seen in FIG. 1.

To lock the auxiliary trailer into this transport position, a rearward end portion of each support plate 63 is provided with a pin receiving opening 79. A similar pin receiving opening 80 is provided in each side beam extension 62. When the main frame side beam extensions 62 are horizontally aligned with their side beams 22, a holding pin 81 is inserted through the openings 79 and 80 to retain the auxiliary trailer 14 and any load on it, such as boat 34, in the transport position to thus immobilize the linear hydraulic motor 70 until such time as the auxiliary trailer is to be moved to its loading position.

The above-described means to pivot the hitched auxiliary trailer frame with respect to the main frame is the best means devised to date to accomplish that purpose. However, it is probably the not the cheapest means. Many other means could be used. Tried out and proved to be effective are the use of manual hand cranks, ratchets and cable means supported on the main frame. Jacking up the rear of the auxiliary trailer from the ground is effective. So is manually lifting the rear of the auxiliary trailer when it is not loaded.

Similarly, many different means can be used to maintain the auxiliary trailer and frame in the transport position. One such modification will be discussed in connection with FIG. 9.

With changes in loading, the distribution of the weight of the combined house trailer and auxiliary trailer apparatus can vary considerably. For example, with the auxiliary trailer 14 loaded with boat 34 as seen in FIG. 1, the entire weight of the auxiliary trailer and the boat are cantilevered rearwardly from the first set of wheels 20. In contrast, when the auxiliary trailer is in its transport position but with no auxiliary load such as the boat 34, a large amount of the weight will tend to be supported by the trailer hitch 42 bearing on the trailer ball 44 and on the rear end of the pickup truck 16. It is advantageous, therefore, that the first set of wheels 20 can be repositioned with respect to the main frame to adjust the loading. To accomplish this, a U-shape wheel mount member 84 is supported on each pair of wheels of the first set of wheels as seen in FIGS. 6 and 7. Side plates 86,86 of the U-shape wheel mount members 84 extend upwardly parallel to each other and in facing, contacting relation to the sides of each of the main frame side beams 22,22. The bottom surfaces of the hollow side beams 22 each rest on a plurality of rollers 88 rotatably mounted in the side plates 86,86 of the wheel mount member 84. Positioning openings 90,90 are provided, one in each end of each side plate 86; and a series of openings 92 are provided in the side walls of each of the side beams 22 in horizontal alignment with openings 90. With the main frame otherwise supported to take the weight off of the wheels 20, the positioning of the wheel mount members 84 and the first set of wheels 20 with respect to the main frame 18 can be adjusted as desired; and a wheel mount positioning pin 94 can be passed through each of the aligned openings 90 and an appropriate one of the openings 92 in order to fix the wheels in a more advantageous position to handle particular loadings.

In order to utilize more of the entire main frame 18 when the auxiliary trailer 14 is disconnected from the house trailer, the second movable portion 30 of the main closure 26 can be moved rearwardly with respect to the first fixed portion 28. The first forward portion 28 is provided with a fixed floor 100, and the second movable rearward portion 30 is provided with a slidable floor 102 overlying the floor 100. As best seen in FIG. 6, house extension rollers 104 are pivotally mounted at the rear end of the second rearward portion 30 to roll on each of the main frame side beams 22,22.

A number of different means can be devised for moving the second rearward portion of the house 24 between its collapsed first position as seen in FIGS. 1 and 2 and its extended second position as seen in FIG. 4. These means can include handles on the rear sides of second portion 30 for manually moving that portion with respect to the first portion, for example.

Another means includes connecting a cylinder 106 of a house-extending, linear, hydraulic motor 108 and rotatably supporting a pair of concentric, independently rotatable cable pulleys 110 (one is shown) at the outer end of a piston rod 112 of the hydraulic motor 108. A first extension drive cable 114 runs in one of the freely rotating pulleys 110. Cable 114 is anchored at its first end at 115 to the floor 102 of the second portion 30 of the living quarters 24. This cable 114 extends through a provided slot 116 in the fixed floor 100 of the forward portion 28 of the house; and is anchored at its second end at 117 to an adjacent vertical wall of a side beam 22. A second collapsing drive cable 118 runs in the other cable pulley 110, and is connected as at 119 to a rearward portion of the slidable floor 102 and is anchored as at 120 to the side wall of side beam 22.

This is seen somewhat schematically in FIG. 8. The parts in that figure are shown as they would appear with a second slidable rearward portion 30 of the house 24 in an at least partly extended position. When the linear hydraulic motor 108 is extended, one inch of movement of the piston rod 112 will cause the slidable floor 102 to move two inches under the control of second collapsing drive cable 118. When the length of the hydraulic motor 102 is shortened, a one inch movement of the piston rod 112 will cause two inches of movement of the slidable floor 102 and hence of the rearward portion 30 of the house 24 to move toward its extended position.

When the house 30 is at its maximum extended position, and assuming, as shown in FIG. 6, that the trailer ball 44 is movable with the rear end edge of the second slidable portion 30 of the house 24, it is necessary only to fasten the trailer hitch 42 to the trailer ball 40 with the house trailer 12 positioned as seen in FIG. 4. Then the means to collapse the house from its extended position as seen in FIG. 4 to its collapsed position as seen in FIG. 2 is used to bring the auxiliary trailer 14 forward so that the support means lifting flanges 66 are in operative position underneath the axle means 38 as is seen in FIG. 2. At that point, the means to lift the auxiliary trailer 14 forward from its loading position to its transport position is activated to achieve the positioning of the parts as seen in FIG. 1. The holding pins 81 are then inserted through pin receiving openings 79 and 80, and the apparatus of the invention is ready for over-the-road transport.

While a boat is illustrated as being the auxiliary load supported on the auxiliary trailer, it is to be understood that many other loads could be so positioned. These loads can include snowmobiles, all-terrain vehicles (ATVs), motorcycles, cargo containers, etc., etc.

Referring now to FIG. 9, a variant means for maintaining the auxiliary trailer frame 32 and, therefore, the auxiliary trailer 14 in its transport position includes a hollow pair of spaced-apart, mutually parallel, longitudinally extending side beams 22,22 (one is shown). A pair of auxiliary trailer support bars 130,130 are each snugly and slidably mounted inside one of the hollow side beams 22. Each such bar is movable between a support position under the axle means 38, as seen in FIG. 9, and a storage position clear of the axle means. Supporting bar positioning openings 132 are provided at rearward end portions of each hollow side beam 22 for receiving a bar position retaining pin 134. Each of the auxiliary trailer support bars 130 has two positioning openings 136 through it. One opening 136 is for use to maintain the support bar in stored position clear of the axle means 38, and the other opening 136 is located so as to maintain the bar 130 in position to support the axle means.

Although the present invention has been described with reference to preferred embodiments, workers skilled in the art will recognize that changes may be made in form and detail without departing from the spirit and scope of the invention.

What is claimed is:

1. For use with a prime mover, a combination house vehicle and auxiliary trailer apparatus including:
    (a) a longitudinally extending house vehicle operably associated with the prime mover and including a main frame carried by at least one ground-supported set of first wheels for movement on its longitudinal axis, said main frame having a main closure supported on a forward portion thereof;

(b) said main frame including a pair of parallel, spaced-apart, longitudinally extending side beams;

(c) a longitudinally extending auxiliary trailer including an auxiliary trailer frame of configuration to support an auxiliary load thereon, a second set of wheels rotatably mounted with respect to a rearward portion of the auxiliary trailer frame, and auxiliary trailer tongue means extending longitudinally forwardly from the auxiliary trailer frame;

(d) means to pivotally support said auxiliary trailer tongue means with respect to said house vehicle in a hitched position wherein said auxiliary trailer frame is between rearward portions of said main frame side beams and is pivotal with respect to said main frame on at least a horizontal axis transverse to the longitudinal axes of the house vehicle and the auxiliary trailer;

(e) means to pivot the hitched auxiliary trailer frame with respect to the main frame between a loading position with the second set of wheels on the ground and a transport position with said wheels elevated from the ground; and (f) means to maintain the auxiliary trailer frame in said transport position with respect to the main frame during over-the-road transport of the combination house vehicle and auxiliary trailer apparatus.

2. The combination of the house vehicle and auxiliary trailer apparatus according to claim 1 wherein:

(g) means to pivotally support said auxiliary trailer tongue means with respect to said main frame includes a trailer connector having a first part integrally mounted with respect to the house vehicle and a second part mounted to a forward portion of the trailer tongue means and adapted to connect to the first part to permit pivotal movement of the trailer tongue means with respect to the house vehicle on at least a horizontal axis.

3. The combination of a house vehicle and auxiliary trailer apparatus according to claim 1 wherein:

(g) the house vehicle is a house trailer which includes a wheel mount carried by said first pair of wheels, said mount being shiftable longitudinally with respect to the house trailer main frame; and (h) means is provided for shifting said mount with respect to said main frame and for securing said wheel mount in selected positions relative to said main frame whereby the weight distribution on the first set of wheels of the house trailer with or without the auxiliary trailer can be more nearly balanced under various conditions of loading.

4. The combination of a house vehicle and auxiliary trailer apparatus according to claim 3 wherein:

(i) the main closure includes a permanent first portion fixedly mounted with respect to a forward part of the house trailer main frame and a slidable main closure second portion telescopically mounted with respect to said first portion for movement between a collapsed first position overlapping with said first portion and an extended second position almost entirely rearwardly of said first main closure portion; and (j) means is provided on the house trailer to move the second main closure portion between its collapsed first position and its extended second position.

5. The combination of a house vehicle and auxiliary trailer apparatus according to claim 1 wherein:

(g) the main closure includes a permanent first portion fixedly mounted with respect to a forward part of the house vehicle main frame and a slidable main closure second portion is telescopically mounted with respect to said first portion for movement between a collapsed first position overlapping substantially with said first portion and an extended second position almost entirely rearwardly of said first main closure portion; and (h) means is provided on the house vehicle to move the second main closure portion between its collapsed first position and its extended second position.

6. The combination house and auxiliary trailer apparatus of claim 5 wherein:

(i) means to fasten said auxiliary trailer tongue integrally with respect to said house trailer is longitudinally movable with respect to said main frame and is fixedly mounted in spaced relation to, and rearwardly of, a lower portion of said slidable second portion of said main closure.

7. For use with a prime mover, a combination house vehicle and auxiliary trailer apparatus including:

(a) a longitudinally extending house vehicle operably associated with the prime mover and including a main frame carried by at least one ground-supported set of first wheels for movement on its longitudinal axis, said main frame having a main closure supported on a forward portion thereof;

(b) said main frame including a pair of parallel spaced-apart, longitudinally extending side beams;

(c) a longitudinally extending auxiliary trailer including an auxiliary trailer frame of configuration to support an auxiliary load thereon, a second set of wheels rotatably mounted with respect to a rearward portion of the auxiliary trailer frame and extending outboard of said frame in position to support the auxiliary trailer frame on the ground for movement on its longitudinal axis, and auxiliary trailer tongue means extending longitudinally forwardly from the auxiliary trailer frame;

(d) means to pivotally support said auxiliary trailer tongue means with respect to said main frame in a hitched position wherein said auxiliary trailer frame is between rearward portions of said main frame side beams and is pivotable with respect to said main frame on at least a horizontal axis transverse to the longitudinal axes of the house vehicle and the auxiliary trailer, said second set of wheels being far enough from said auxiliary trailer frame so that each wheel of the second set will be situated farther outboard than its adjacent main frame side beam when the parts are in said hitched position;

(e) means to pivot the hitched auxiliary trailer frame with respect to the main frame between a loading position with the second set of wheels on the ground and a transport position with said wheels elevated from the ground; and maintain the auxiliary trailer frame (f) means to maintain the auxiliary trailer frame in said transport position with respect to the main frame during over-the-road transport of the combination house vehicle and auxiliary trailer apparatus.

8. The combination of the house vehicle and auxiliary trailer apparatus according to claim 7 wherein:

(g) means to pivotally support said auxiliary trailer tongue means with respect to said main frame includes a trailer ball integrally mounted with respect to said house vehicle, a trailer tongue of the trailer tongue means extending forwardly from the auxiliary trailer frame, and a trailer hitch at a forward end of the trailer tongue.

9. The combination of the house vehicle and auxiliary trailer apparatus according to claim 7 wherein:
(g) means to pivot the auxiliary trailer frame with respect to the main frame to move the auxiliary trailer frame from its loading position to its transport position includes:
   (1) auxiliary trailer support means fixedly mounted to the auxiliary trailer frame inboard of the second set of wheels, said support means being in longitudinal alignment with each of said side beams,
   (2) a longitudinally extending side beam extension pivotally mounted to the rear of each of the main frame side beams, each such extension having a trailer support means lifting portion at a rear end thereof, each lifting portion being positioned in underlying, intercepting relationship to said auxiliary trailer support means when said auxiliary trailer tongue means is pivotally supported with respect to said main frame, and
   (3) means to pivot said side beam extensions upwardly with respect to said side beams to cause said trailer support means lifting portion to lift said trailer support means to bring the auxiliary trailer frame to its transport position.

10. The combination of a house vehicle and auxiliary trailer apparatus according to claim 9 wherein:
(h) the house vehicle is a house trailer;
(i) means to pivotally support said auxiliary trailer tongue means with respect to said main frame includes a trailer ball positioned with respect to said main frame, a trailer tongue extending forwardly from the auxiliary trailer frame, and a trailer hitch at a forward end of the trailer tongue;
(j) the main closure includes a permanent first portion fixedly mounted with respect to a forward part of the house trailer main frame and a slidable main closure second portion which is telescopically mounted with respect to said first portion for movement between a collapsed first position overlapping substantially with said first portion and an extended second position almost entirely rearwardly of said first main closure portion;
(k) means is provided on the house trailer to move the second main closure portion between its collapsed first position and its extended position;
(l) said trailer ball is fixedly positioned with respect to the lower rear edge of the slidable main closure second portion; and
(m) the parts are so positioned that the trailer hitch and trailer ball can be connected with the auxiliary trailer wheels on the ground and the slidable second portion of the main closure in its extended position, and, when said slidable second portion is moved to its collapsed position, the trailer ball will draw the auxiliary trailer into a position where the auxiliary trailer support means is positioned in overlying, interceptable relationship to said trailer support lifting means.

11. The combination of the house vehicle and auxiliary trailer apparatus according to claim 9 wherein:
(h) at least one beam extension support plate extends rigidly in a generally vertical plane from a rear portion of one of said main frame side beam members and its pivotally mounted beam extension member and lies in parallel overlapping relation with respect to the other such member; and
(i) said means to maintain the auxiliary trailer frame in its transport position includes an opening provided in said overlapping extension support plate in spaced relation to the pivotal connection between said beam member and beam extension member, a matching opening provided through the overlapped member, said overlapped member opening being positioned to be in alignment with said extension support plate opening when the extension member is positioned to hold the trailer frame in its transport position, and a support pin configured to pass through said plate and member openings when so aligned.

12. The combination of the house vehicle and auxiliary trailer apparatus according to claim 11 wherein:
(j) the auxiliary trailer support means is constituted as axle means rotatably supporting the second set of wheels on the auxiliary trailer frame.

13. The combination of the house vehicle and auxiliary trailer apparatus according to claim 9 wherein:
(h) at least rear portions of the main frame side beams are of hollow, box beam construction; and
(i) said means to maintain the auxiliary trailer in its transport, position includes:
   (1) auxiliary trailer support means fixedly mounted on a rear portion of the auxiliary trailer frame,
   (2) a pair of auxiliary trailer support bars each snugly and slidably mounted inside one of said hollow side beams and each being movable between a support position under said auxiliary trailer support means and a storage position inside its side beam in clearing relation to said auxiliary trailer support means.

14. The combination of claim 13 wherein:
(j) the auxiliary trailer support means is constituted as axle means rotatably supporting the second set of wheels with respect to the auxiliary trailer frame.

* * * * *

UNITED STATES PATENT AND TRADEMARK OFFICE
CERTIFICATE OF CORRECTION

PATENT NO. : 5,069,471

DATED : December 3, 1991

INVENTOR(S) : Van Der Linden et al.

It is certified that error appears in the above-identified patent and that said Letters Patent is hereby corrected as shown below:

Col. 8, lines 60-61, delete "maintain the auxiliary trailer frame".

Signed and Sealed this

Sixth Day of April, 1993

Attest:

STEPHEN G. KUNIN

*Attesting Officer*    *Acting Commissioner of Patents and Trademarks*